US011459500B2

(12) United States Patent
Khamatnurova et al.

(10) Patent No.: US 11,459,500 B2
(45) Date of Patent: Oct. 4, 2022

(54) FOAMED TREATMENT FLUIDS COMPRISING NANOPARTICLES

(71) Applicant: Halliburton Energy Services, Inc., Houston, TX (US)

(72) Inventors: Tatyana V. Khamatnurova, Spring, TX (US); Philip D. Nguyen, Houston, TX (US); Ronald Glen Dusterhoft, Katy, TX (US); Jun Su An, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/269,195

(22) PCT Filed: Sep. 17, 2018

(86) PCT No.: PCT/US2018/051335
§ 371 (c)(1),
(2) Date: Feb. 17, 2021

(87) PCT Pub. No.: WO2020/060529
PCT Pub. Date: Mar. 26, 2020

(65) Prior Publication Data
US 2021/0207021 A1    Jul. 8, 2021

(51) Int. Cl.
*C09K 8/70* (2006.01)
*C09K 8/68* (2006.01)
(Continued)

(52) U.S. Cl.
CPC .............. *C09K 8/703* (2013.01); *C09K 8/68* (2013.01); *C09K 8/80* (2013.01); *E21B 43/267* (2013.01); *C09K 2208/10* (2013.01)

(58) Field of Classification Search
None
See application file for complete search history.

(56) References Cited

U.S. PATENT DOCUMENTS 9,873,827 B2   1/2018  Chakraborty et al.
2003/0220204 A1  11/2003  Baran, Jr. et al.
(Continued)

FOREIGN PATENT DOCUMENTS

WO    2018/004560 A1    1/2018

OTHER PUBLICATIONS

Xiao, Chongwei, Suriya N. Balasubramanian, and Lee W Clapp. "Rheology of Supercritical CO 2 Foam Stabilized by Nanoparticles." SPE Improved Oil Recovery Conference. Society of Petroleum Engineers, 2016.
(Continued)

*Primary Examiner* — Andrew Sue-Ako
(74) *Attorney, Agent, or Firm* — Conley Rose, P.C.; Rodney B. Carroll (57) ABSTRACT

Foamed treatment fluids for use in subterranean formations are provided. In one embodiment, a method of using a foamed treatment fluid comprises: introducing a foamed treatment fluid into a wellbore penetrating at least a portion of a subterranean formation at or above a pressure sufficient to create or enhance one or more fractures in the subterranean formation, wherein the foamed treatment fluid comprises an aqueous base fluid, one or more surfactants, a natural gas, and a plurality of nanoparticles.

21 Claims, 2 Drawing Sheets

(51) Int. Cl.
*C09K 8/80* (2006.01)
*E21B 43/267* (2006.01)

(56) References Cited

U.S. PATENT DOCUMENTS

| | | | |
|---|---|---|---|
| 2012/0015852 A1* | 1/2012 | Quintero | C09K 8/05 |
| | | | 507/119 |
| 2013/0118383 A1* | 5/2013 | Al-Bagoury | C09K 8/467 |
| | | | 106/801 |
| 2013/0274149 A1 | 10/2013 | Lafitte et al. | |
| 2015/0080271 A1* | 3/2015 | De Wolf | C09K 8/76 |
| | | | 507/213 |
| 2016/0108307 A1 | 4/2016 | Nguyen et al. | |
| 2017/0044425 A1 | 2/2017 | Barati Ghahfarokhi | |
| 2017/0058186 A1* | 3/2017 | Oghena | C09K 8/592 |
| 2017/0190960 A1 | 7/2017 | Tang et al. | |
| 2017/0275520 A1 | 9/2017 | Babcock et al. | |
| 2017/0275521 A1* | 9/2017 | Babcock | C09K 8/703 |

OTHER PUBLICATIONS

Yekeen, Nurudeen, et al. "A comprehensive review of experimental studies of nanoparticles-stabilized foam for enhanced oil recovery." Journal of Petroleum Science and Engineering 164 (2018): 43-74.
International Search Report and Written Opinion issued in related PCT Application No. PCT/US2018/051335 dated Jun. 14, 2019, 12 pages.

\* cited by examiner

FOAMED TREATMENT FLUIDS COMPRISING NANOPARTICLES

CROSS-REFERENCE TO RELATED APPLICATION

The present application is a U.S. National Stage Application of International Application No. PCT/US2018/051335 filed Sep. 17, 2018, which is incorporated herein by reference in its entirety for all purposes.

BACKGROUND

The present disclosure relates to systems and methods for use in subterranean formations, and more specifically, systems and methods for using foamed treatment fluids in subterranean formations.

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Foamed treatment fluids are used in a variety of operations that may be performed in subterranean formations. As referred to herein, the term "foamed treatment fluid" will be understood to include any foamed fluid that may be used in a subterranean application in conjunction with a desired function and/or for a desired purpose. The term "treatment fluid" does not imply any particular action by the fluid. Foamed treatment fluids often are used in, e.g., well drilling, completion, and stimulation operations. Examples of such foamed treatment fluids include, inter alia, drilling fluids, well cleanup fluids, workover fluids, conformance fluids, cementing fluids, gravel pack fluids, acidizing fluids, fracturing fluids, spacer fluids, and the like.

Certain foamed treatment fluids include gases such as carbon dioxide or nitrogen, which may, in certain conditions, cause flaring or require additional downstream separation. Additionally, in some cases, carbon dioxide has the potential to cause corrosion of well equipment. Some foamed treatment fluids are unstable due to foam drainage, rupture of liquid films, or inter-bubble gas diffusion. For example, certain gas-in-water foams are not stable enough in the presence of a surfactant. Other foamed treatment fluids have limited applications in high temperatures and salinity due to high absorption and low durability of surfactants under those conditions. Foamed treatment fluids may include guar gel or synthetic polymers as a stabilizer. However, those types of additives can, in some cases, cause formation damage due to the presence of guar and synthetic polymers.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to systems and methods for use in subterranean formations. Particularly, the present disclosure relates to systems and methods for the use of certain foamed treatment fluids in subterranean formations.

The present disclosure provides a method including introducing a foamed treatment fluid into a wellbore penetrating at least a portion of a subterranean formation at or above a pressure sufficient to create or enhance one or more fractures in the subterranean formation, wherein the foamed treatment fluid includes an aqueous base fluid, one or more surfactants, a natural gas, and a plurality of nanoparticles. In certain embodiments, the present disclosure provides a foamed treatment fluid including an aqueous base fluid; one or more surfactants; a plurality of nanoparticles; and natural gas.

In some embodiments, the present disclosure provides a method including introducing a first foamed treatment fluid into a wellbore penetrating at least a portion of a subterranean formation at or above a pressure sufficient to create or enhance at least one fracture in the subterranean formation, wherein the first foamed treatment fluid includes a first gas, a first aqueous base fluid, one or more first surfactants, and a first plurality of nanoparticles; introducing a second treatment fluid into the wellbore at or above a pressure sufficient to create or enhance at least one microfracture in the subterranean formation, wherein the second treatment fluid includes a second gas, a second aqueous base fluid, a second plurality of nanoparticles, and a micro-proppant material; and introducing a third foamed treatment fluid into the wellbore, wherein the third foamed treatment fluid includes a third gas, a third aqueous base fluid, a third plurality of nanoparticles, one or more second surfactants, and a proppant material.

Among the many potential advantages to the methods and compositions of the present disclosure, only some of which are alluded to herein, present disclosure may provide improved methods, compositions, and systems for the use of foamed treatment fluids in a wellbore penetrating at least a portion of a subterranean formation. In certain embodiments, the foamed treatment fluids of the present disclosure may be sufficiently stable for use in subterranean treatments with less surfactant than foamed treatment fluids without nanoparticles. In some embodiments, the foamed treatment fluids may effectively transport and suspend proppant deeper in a fracture and/or in a more distributed manner than conventional treatment fluids. In some embodiments, the foamed treatment fluids of the present disclosure may be sufficiently stable for long periods to carry proppant downhole, even when subjected to the high shear (e.g., during flowing through surface and downhole equipment, perforations), high temperature, and/or high pressure. In certain embodiments, the nanoparticles of the foamed treatment fluids may be smaller than pores in proppant packs, allowing the nanoparticles to be transported out of the reservoir during flowback.

Additionally, the nanoparticles and fluids of the present disclosure may have tunable properties. For example, in certain embodiments, certain properties of the nanoparticles may be tuned by adjusting the composition of a coating on the nanoparticles or adjusting the concentration of the nanoparticles in the foamed treatment fluids. In some embodiments, the rheology (e.g., viscosity) of the foamed treatment fluids may be tunable. Finally, in certain embodiments, the plurality of nanoparticles may be used to treat one or more surfaces in the subterranean formation (e.g., a surface of a fracture or a microfracture). In some embodiments, nanoparticles may stabilize surfaces of fractures in the subterranean formation. For example, the nanoparticles may stabilize clay-laden subterranean formations. Furthermore, foaming a treatment fluid may reduce the water requirement of the fluid, which may minimize problems associated with clay swelling. The foamed treatment fluids of the present disclosure may, in certain embodiments, have low fluid loss properties, potentially reducing or removing the need for a fluid loss control additive.

The treatment fluids of the present disclosure may include a plurality of nanoparticles. In some embodiments, nanoparticles may stabilize the foam of a foamed treatment fluid. Without wishing to be limited by theory, it is believed that the nanoparticles may kinetically stabilize the foam at the gas-liquid interface. In some embodiments, the nanoparticles may include an inorganic material, including, but not limited to silica, carbon black, laponite, graphene, aluminum, iron, titanium, a metal oxide, a hydroxide, an alkali earth metal or oxide thereof, a transition metal or oxide thereof, a post-transition metal or oxide thereof, and any combination thereof. In certain embodiments, the nanoparticles may include magnetizable nanoparticles (e.g., iron nanoparticles). In some embodiments, the nanoparticles may include a biologically derived nanoparticle, including, but not limited to crystalline nanocellulose, chitin, a lignin, a starch, a protein, and any combination thereof. In certain embodiments, the plurality of nanoparticles may include particles having a diameter of 100 nm or smaller, 10 nm or smaller, or 1 nm or smaller. In some embodiments, the plurality of nanoparticles may include particles having a diameter of from about 0.1 nm to about 100 nm. In certain embodiments, the plurality of nanoparticles may exhibit a particle size distribution between about 0.1 nm and about 100 nm. For example, in some embodiments, the plurality of nanoparticles may have a d50 particle size distribution of from about 0.1 nm to about 100 nm. In certain embodiments, the plurality of nanoparticles may exhibit a d50 particle size distribution of 100 nm or smaller, 10 nm or smaller, or 1 nm or smaller.

The plurality of nanoparticles may be present in the foamed treatment fluid in an amount sufficient to stabilize the foam. In some embodiments, the foamed treatment fluid including nanoparticles may be sufficiently stable for use in treatment operations at temperatures of over 150° F., over 200° F., over 250° F., over 300° F., or over 350° F. In some embodiments, the concentration of the plurality of nanoparticles in the foamed treatment fluid may be tuned to adjust one or more properties of foam (e.g., density, foam quality, etc.) and/or adjust how quickly the foam will degrade when exposed to the downhole environment. In certain embodiments, the plurality of nanoparticles may be present in foamed or non-foamed treatment fluids in an amount of at least 0.01 pounds per gallon (ppg), at least 0.05 ppg, or at least 0.1 ppg of the treatment fluid. In certain embodiments, the plurality of nanoparticles may be present in an amount of from about 0.01 ppg to about 0.2 ppg of the treatment fluid. In certain embodiments, the plurality of nanoparticles may be present in an amount of from about 0.1 wt % to about 50 wt % by weight of the treatment fluid. In some embodiments, the plurality of nanoparticles may be present in amount greater than 1 wt %, 5 wt %, 10 wt %, 15 wt %, 20 wt %, 25 wt %, 30 wt %, 35 wt %, 40 wt %, or 45 wt % by weight of the treatment fluid. In some embodiments, the plurality of nanoparticles may be present in an amount of from about 1 wt % to about 30 wt %, from about 5 wt % to about 20 wt %, from about 10 wt % to about 30 wt %, from about 15 wt % to about 30 wt %, all by weight of the treatment fluid.

In certain embodiments, at least a portion of the plurality of nanoparticles may be hydrophobically treated or modified (e.g., to enhance the affinity of the nanoparticle to natural gas or other substances). In certain embodiments, the hydrophobic modification may provide enhanced foam stability to the foamed treatment fluid compared to a foamed treatment fluid including unmodified nanoparticles. In certain embodiments, at least a portion of the plurality of nanoparticles may include a coating. Examples of types of coatings suitable for certain embodiments of the present disclosure include, but are not limited to a paraffin inhibitor, a formation stabilizer, a scale inhibitor, and any combination thereof. In certain embodiments, the surface of the nanoparticles may be modified by the addition of a surface modifying agent, which may be inorganic or organic. Examples of inorganic surface modifying agents suitable for certain embodiments of the present disclosure include, but are not limited to silicon oxide, sodium oxide, potassium oxide, calcium oxide, zirconium oxide, aluminum oxide, lithium oxide, iron oxide, cordierite, spinel, spodumene, steatite, a silicate, a substituted aluminosilicate clay, and any combination thereof. In one or more embodiments, the nanoparticles may be surface modified, for instance, by the addition of one or more chemical groups, such as hydrophilic groups or hydrophobic groups. In certain embodiments, the chemical groups may be surfactants, polymers, ionic groups, ionizable groups, acid groups, salts, surface active agents, and any combination thereof. Examples of organic surface modifying agents suitable for certain embodiments of the present disclosure include, but are not limited to an aliphatic compound, an ionic compound, an aromatic compound, an organic polymeric compound, and any combination thereof. The organic material or chemical groups may be bonded to the nanoparticle surface, adsorbed, or otherwise attached. The organic material may, in certain embodiments, modify the nanoparticle's propensity to interact with aqueous solutions, thus making the proppant either hydrophobic, hydrophilic, or hydro-neutral.

In certain embodiments, the foam of the foamed treatment fluid may entirely or partially revert or degrade into an unfoamed liquid during or after its use in a treatment. In some embodiments, the foam may degrade over time or in response to one or more additives, fluids, or conditions that initiate or otherwise cause degradation. Examples of conditions that may initiate or otherwise cause degradation suitable for certain embodiments of the present disclosure include, but are not limited to a change in pH, temperature, pressure, salinity, and any combination thereof. In some embodiments, exposure to hydrocarbons may initiate or otherwise cause degradation. Any combination of one or more additives, fluids, or conditions may initiate the degradation of the foam of the foamed treatment fluid. In some embodiments, a degradation fluid may be introduced into the subterranean formation to contact the foamed treatment fluid and initiate degradation of the foam. For example, an acidic fluid may be introduced into the subterranean formation to contact the foamed treatment fluid and cause the foam to degrade. In certain embodiments, the degradation of the foam may cause the nanoparticles to fall out of the treatment fluid and/or deposit in the subterranean formation.

In certain embodiments, the nanoparticles may deposit or adhere to one or more surfaces in the subterranean formation (e.g., a surface in the fracture or microfracture). For example, in certain embodiments, after the foam degrades, the nanoparticles may be deposited in the subterranean formation onto one or more surfaces of the subterranean formation. In some embodiments, the nanoparticles may form a permeable surface membrane or layer on the one or more surfaces of the subterranean formation. Such a membrane or layer may, in certain embodiments, alter the wettability of the surface, stabilize the surface (e.g., stabilize clay-laden formation surfaces), provide resistance to proppant embedment, control fluid invasion/penetration into the surfaces, provide a resilient surface that retains open flow channels, increase the relative permeability of hydrocarbons, or provide any combination thereof.

The treatment fluids of the present disclosure may also include conventional-sized proppant or micro-proppant materials in addition to or in place of the nanoparticles. In some embodiments, a first foamed treatment fluid comprising a plurality of nanoparticles may be introduced into a subterranean formation at or above a pressure sufficient to create or enhance at least one fracture or microfracture in the formation, and then a second non-foamed treatment fluid comprising the nanoparticles and a proppant material (e.g., fracturing sand) may be introduced into the at least one fracture or microfracture. The proppant material may, in certain embodiments, be deposited into fracture. Proppant or micro-proppant materials suitable for use in certain embodiments of the present disclosure may include any material suitable for use in subterranean operations. In certain embodiments, the micro-proppant and proppant material may include, but is not limited to silica flour, ceramic (e.g., ceramic microspheres), glass (e.g., glass microspheres), cenospheres, shells (e.g., nut shells), seeds, fruit pit materials, ceramics, sand (e.g., natural sand, quartz sand, nut shells), gravel, garnet (e.g., particulate garnet), metal (e.g., metal particulates or beads), glass, nylon (e.g., nylon pellets), wood (e.g., processed wood), ore (e.g., bauxite, or other ores), polymeric materials (e.g., polymer beads), a tetrafluoroethylene material, a superhydrophobic material, a composite material, and any combination thereof. Examples of composite materials suitable for certain embodiments of the present disclosure include, but are not limited to silica, alumina, fumed silica, carbon black, graphite, mica, titanium dioxide, meta-silicate, calcium silicate, kaolin, talc, zirconia, boron, fly ash, geopolymer, and any combination thereof.

In some embodiments, proppant material size generally may range from about 10 mesh to about 200 mesh on the U.S. Sieve Series. In some embodiments, proppant material size generally may range from about 20 mesh to about 100 mesh on the U.S. Sieve Series. In certain embodiments, the proppant material may have a diameter of at least 0.1 mm or at least 1 mm. In some embodiments, the proppant material size distribution may range from about 0.1 mm to about 5 mm.

In some embodiments, micro-proppant material size generally may range from about 200 mesh to about 600 mesh on the U.S. Sieve Series. In some embodiments, micro-proppant material size generally may range from about 150 mesh to about 400 mesh on the U.S. Sieve Series. In certain embodiments, the micro-proppant material may have a diameter of at least 0.1 microns, at least 1 micron, or at least 10 microns. In some embodiments, the micro-proppant material size distribution may range from about 0.1 microns to about 100 microns.

In certain embodiments, micro-proppant material may be present in the treatment fluids of the present disclosure in an amount in the range of from about 0.01 ppg to about 1 ppg of the aqueous liquid. In certain embodiments, proppant material may be present in the treatment fluids of the present disclosure in an amount in the range of from about 0.1 ppg to about 10 ppg.

The treatment fluids of the present disclosure may include a gas. Gasses suitable for certain treatment fluids of the present disclosure include, but are not limited to air, nitrogen, carbon dioxide, methane, ethane, a long chain hydrocarbon gas, natural gas, or any combination thereof. In some embodiments, the gas of the treatment fluid is natural gas. As used in this disclosure, "natural gas" means methane alone or blends of methane with other gases such as other gaseous hydrocarbons. For example, natural gas may, in certain embodiments, be a variable mixture of about 85% to 99% methane and 5% to 15% ethane, with further decreasing components of propane, butane, pentane, and with traces of longer chain hydrocarbons. Natural gas, as used herein, also may contain inert gases such as carbon dioxide and nitrogen in varying degrees. For example, in certain embodiments, the natural gas may include, but is not limited to methane, ethane, propane, butane, a trace of a longer chain hydrocarbon, carbon dioxide, nitrogen, and any combination thereof. In some embodiments, the natural gas may be sourced from a storage tank at the well site or from a well in the subterranean formation. In some embodiments, the gas may be methane.

In certain embodiments, a gas may be present in the treatment fluids of the present disclosure in an amount in the range of from about 10% to about 98% by volume of the aqueous fluid in the treatment fluid. In some embodiments, the gas may be present in the treatment fluids of the present disclosure in an amount in the range of from about 20% to about 80% by volume of the aqueous fluid in the treatment fluid, from about 30% to about 80% by volume of the aqueous fluid in the treatment fluid, or from about 50% to about 80% by volume of the aqueous fluid in the treatment fluid.

In certain embodiments, the treatment fluids of the present disclosure may include one or more surfactants. The one or more surfactants may, in some embodiments, facilitate the foaming of the aqueous fluid. In certain embodiments, the one or more surfactants may stabilize the foamed treatment fluid (e.g., in conjunction with the nanoparticles). Examples of surfactants suitable for certain embodiments of the present disclosure include, but are not limited to a switchable zwitterionic surfactant, a polyelectrolyte, a derivative of ethoxylated glyceride, an ethoxylated sorbitan ester, an ethoxylated alcohol, a betaine, an alkali metal alkylene acetate, a sultaine, an ether carboxylate, and any combination thereof. A person of ordinary skill in the art, with the benefit of this disclosure, would understand that other surfactants would be suitable for embodiments of the present disclosure. In certain embodiments, the one or more surfactants may include a cationic surfactant. The cationic surfactant may form a complimentary electrostatic interaction with negatively charged nanoparticles or proppant. In some embodiments, the one or more surfactants may be present in an amount of from about 0.5 to about 12 gallons per thousand gallons of the treatment fluid (gptg), from about 0.5 to about 9 gptg, from about 0.5 to about 7 gptg, from about 0.5 to about 5 gptg, from about 0.5 to about 3 gptg, or from about 0.5 to about 3 gptg. In certain embodiments, the treatment fluid may also include a petroleum distillate, including, but not limited to, olefins, kerosene, diesel oil, gas oil (also known as gas condensate), fuel oil, other petroleum distillates, and any combination thereof.

In certain embodiments, the treatment fluids of the present disclosure may be formed at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of at least one other component so that the streams are combined and mixed while continuing to flow as a single stream as part of the on-going treatment. Such mixing can also be described as "real-time" mixing. In some embodiments, a foamed treatment fluid is prepared by mixing a gas, an aqueous base fluid, one or more surfactants, and a plurality of nanoparticles. In certain embodiments, the foamed treatment fluids of the present disclosure may be prepared by mixing the aqueous base fluid, one or more surfactants, a plurality of nanoparticles, and other components together to form an aqueous mixture and then combining the aqueous mixture with a gas in an in-line mixture to form a foamed treatment fluid. In some embodiments, the nanoparticles may be provided as a nanoparticle slurry, and the nanoparticle slurry may be mixed with the one or surfactants and the aqueous base fluid in a blender.

In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the foamed treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

In some embodiments, a foamed or unfoamed treatment fluid of the present disclosure may include at least one of a hydrolysable in-situ acid generator particle and a hydrolysable in-situ chelating agent generator particle. In certain embodiments, allowing at least one component of the treatment fluid including at least one of a hydrolysable in-situ acid may at least partially hydrolyze. In certain embodiments, an at least partially hydrolyzed component of the treatment fluid may etch a face of one or more of a fracture or microfracture in a subterranean formation. In certain embodiments, the etching may result in the formation of at least one of a channel, a gap, or a combination thereof between the faces of the at least one fracture or microfracture. In certain embodiments, the fractures may include microfractures and microfracture faces. In some embodiments, the hydrolysable in-situ acid generator particle may include at least one hydrolysable acid ester. Examples of hydrolysable acid esters suitable for certain embodiments of the present disclosure include, but are not limited to a homopolymer of lactic acid, a homopolymer of glycolic acid, a copolymer of lactic acid, a copolymer of glycolic acid, a homopolymer of vinyl methylsulphonate, a homopolymer of dimethylphosphonate, a copolymer of vinyl methylsulphonate, a copolymer of dimethylphosphonate, and any combination thereof. Examples of additional hydrolysable acid esters suitable for certain embodiments of the present disclosure include, but are not limited to ethylene glycol monoformate, ethylene glycol diformate, diethylene glycol diformate, glyceryl monoformate, glyceryl diformate, glyceryl triformate, triethylene glycol diformate, a formate ester of pentaerythritol, and any combination thereof. In certain embodiments, the hydrolysable acid ester may be present in an amount of from about 0.1% to about 25% by weight of the base fluid or from about 1% to about 10% by weight of the base fluid.

In some embodiments, the hydrolysable in-situ chelating agent generator particle may include at least one polymer capable of hydrolyzing to an acid and a chelating agent. In certain embodiments, the polymer may include at least one of the following monomers: a phosphonate monomer, a sulfonate monomer, and any combination thereof. Examples of phosphonate monomers suitable for certain embodiments of the present disclosure include, but are not limited to 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta (methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and any combination thereof. In certain embodiments, the hydrolysable in-situ chelating agent generator particle may be present in an amount of from about 0.1% to about 25% by weight of the base fluid or from about 1% to about 10% by weight of the base fluid. In some embodiments, the hydrolysable acid generator particles or chelating agent generator particles may include micro-particles. In certain embodiments, the micro-particles have a diameter from about 0.1 μm to about 150 μm or from about 5 μm to about 100 μm. In certain embodiments, the micro-particles may include particles having a shape of at least one of rods, fibers, spheres, ovals, strips, ribbons, flakes, platelets, and any mixture thereof. In some embodiments, the hydrolysable acid generator particle or chelating agent generator particle may be encapsulated in a degradable material. In some embodiments, the aqueous base fluid includes a slickwater fluid. In several embodiments, a treatment fluid further may include a tackifying agent. In certain embodiments, the tackifying agent is present in an amount of from about 0.01 to about 10% by weight of the base fluid or from about 0.1% to about 5% by weight of the base fluid.

In some embodiments, the method or system includes a pump. The pump is a high pressure pump in some embodiments. As used herein, the term "high pressure pump" refers to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps are known to one having ordinary skill in the art and can include floating piston pumps and positive displacement pumps. In other embodiments, the pump is a low pressure pump. As used herein, the term "low pressure pump" refers to a pump that operates at a pressure of about 1000 psi or less. In some embodiments, a low pressure pump can be fluidly coupled to a high pressure pump. That is, in such embodiments, the low pressure pump is configured to convey the composition to the high pressure pump. In such embodiments, the low pressure pump can "step up" the pressure of the composition before it reaches the high pressure pump.

The treatment fluids used in the methods and compositions of the present disclosure may include any aqueous base fluid known in the art. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in certain embodiments of the present disclosure may comprise water from any source. Such aqueous fluids may comprise fresh water, salt water (e.g., water containing one or more salts dissolved therein), brine (e.g., saturated salt water), seawater, a flowback fluid, produced water, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. For example, in certain embodiments, the treatment fluids may comprise a viscosifying agent including, but not limited to guar, polyacrylamide, a cellulose-derived polymer, and any combination thereof. One of ordinary skill in the art, with the benefit of this disclosure, will recognize when such density and/or pH adjustments are appropriate. In certain embodiments, the treatment fluids may comprise a mixture of one or more fluids and/or gases, including but not limited to emulsions, foams, and the like.

In certain embodiments, the treatment fluids optionally may include any number of additional additives. Examples of such additional additives include, but are not limited to salts, additional surfactants, acids, additional proppant particulates, diverting agents, fluid loss control additives, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the fluid and/or activated. A person skilled in the art, with the benefit of this disclosure, will recognize the types of additives that may be included in the fluids of the present disclosure for a particular application.

In some embodiments, the present disclosure provides methods for using the fluids to carry out a variety of subterranean treatments, including but not limited to hydraulic fracturing treatments, refracturing treatments, acidizing treatments, enhanced oil recovery operations, and drilling operations. In some embodiments, the fluids of the present disclosure may be used in treating a portion of a subterranean formation, for example, in acidizing treatments such as matrix acidizing or fracture acidizing. In certain embodiments, the treatment fluid may be introduced into a subterranean formation. In some embodiments, the treatment fluid may be introduced into a wellbore that penetrates a subterranean formation. In some embodiments, the fluid may be introduced at a pressure sufficient to create or enhance one or more fractures within the subterranean formation (e.g., hydraulic fracturing). In another embodiment, the treatment fluid may be introduced into at least a portion of a subterranean formation at or above a pressure sufficient to create or enhance one or more fractures in the subterranean formation, wherein the foamed treatment fluid is formed by injecting a gas, an aqueous base fluid, one or more surfactants, and a plurality of nanoparticles into a mixing device (e.g., a blender).

In certain embodiments, a method of fracturing a subterranean formation includes one or more of the following steps: perforating and isolating an interval of interest in the subterranean formation; injecting a first foamed treatment fluid into a wellbore penetrating at least a portion of the subterranean formation within the interval of interest at or above a pressure sufficient to create or enhance at least one fracture or microfracture, wherein the first foamed treatment fluid is formed by mixing a first gas, a first aqueous base fluid, one or more first surfactants, and a first plurality of nanoparticles; allowing at least some of the first plurality of nanoparticles to enter and become deposited on (e.g., form a membrane or layer on) the at least one surface of the at least one fractures or microfractures; injecting a second treatment fluid into the wellbore, wherein the second treatment fluid is formed by mixing a second aqueous base fluid, a second plurality of nanoparticles, and a proppant material (e.g., fracturing sand); and allowing at least some of the proppant material to deposit in the at least one fracture or microfracture. In certain embodiments, the steps of injecting the first foamed treatment fluid and the second treatment fluid may be repeated one or more times in an alternating fashion. In some embodiments, another interval of the subterranean formation may be perforated and isolated and the remaining steps of the method may be performed for that other interval.

In certain embodiments, a method of fracturing a subterranean formation may include one or more of the following steps: perforating and isolating an interval of interest; injecting a first foamed treatment fluid into a wellbore penetrating at least a portion of the subterranean formation at or above a pressure sufficient to create or enhance at least one fracture or microfracture, wherein the first foamed treatment fluid is formed by mixing a first gas, a first aqueous base fluid, one or more first surfactants, and a first plurality of nanoparticles; allowing at least some of the first plurality of nanoparticles to enter and become deposited on (e.g., form a membrane or layer on) the at least one surface of the at least one fractures or microfractures; injecting a second treatment fluid into the wellbore, wherein the second treatment is formed by mixing a second aqueous base fluid, a second plurality of nanoparticles, and a micro-proppant material; allowing at least some of the micro-proppant material to deposit in the at least one fracture or microfracture; injecting a third foamed treatment fluid into the wellbore, wherein the third foamed treatment is formed by mixing a third gas, a third aqueous base fluid, one or more third surfactants, a third plurality of nanoparticles, and a proppant material (e.g., fracturing sand); and allowing at least some of the proppant material to deposit in the at least one fracture or microfracture. In certain embodiments, the steps of injecting the first, second, or third treatment foamed fluids may be repeated one or more times in an alternating fashion in order to fracture and place the nanoparticles, micro-proppant material and proppant material in the subterranean formation. In some embodiments, another interval of the subterranean formation may be perforated and isolated and the remaining steps of the method may be performed for that other interval. In some embodiments, the second treatment fluid may not include a foam.

The compositions of the present disclosure may be prepared using any suitable method and/or equipment (e.g., blenders, mixers, stirrers, etc.) known in the art at any time prior to their use. The compositions may be prepared at a well site or at an offsite location. In certain embodiments, the additives of the present disclosure and/or other components of the treatment fluid may be metered directly into a base fluid to form a treatment fluid.

The methods and compositions of the present disclosure may be used during or in conjunction with any subterranean operation. For example, the methods and/or compositions of the present disclosure may be used in the course of a fracturing treatment. In certain embodiments, the nanoparticle and/or proppant material may be used for propping open the fractures in a subterranean formation. In certain embodiments, the plurality of nanoparticles, proppant material, and/or micro-proppant material may be suspended in at least a portion of the foamed treatment fluid so that the solids are deposited in the fractures when the foamed treatment fluid reverts to a thin fluid to be returned to the surface. The proppant material or micro-proppant material deposited in the fractures prevent the fractures from fully closing and maintains conductive channels through which produced hydrocarbons can flow.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes an aqueous fluid producing apparatus 20, a fluid source 30, a nanoparticle source 40, a surfactant source 70, and a pump and blender system 50 and resides at the surface at a well site where a well 60 is located. In certain embodiments, the aqueous fluid producing apparatus 20 combines one or more surfactants from surfactant source 70 with an aqueous fluid (e.g., liquid or substantially liquid) from fluid source 30, to produce an aqueous fluid including one or more surfactants. The aqueous fluid can be a fluid ready for use in a fracture stimulation treatment of the well 60 or a concentrate to which additional fluid is added prior to use in a fracture stimulation of the well 60. In some embodiments, the aqueous fluid producing apparatus 20 can be omitted and the aqueous fluid sourced directly from the fluid source 30.

Figure 1:
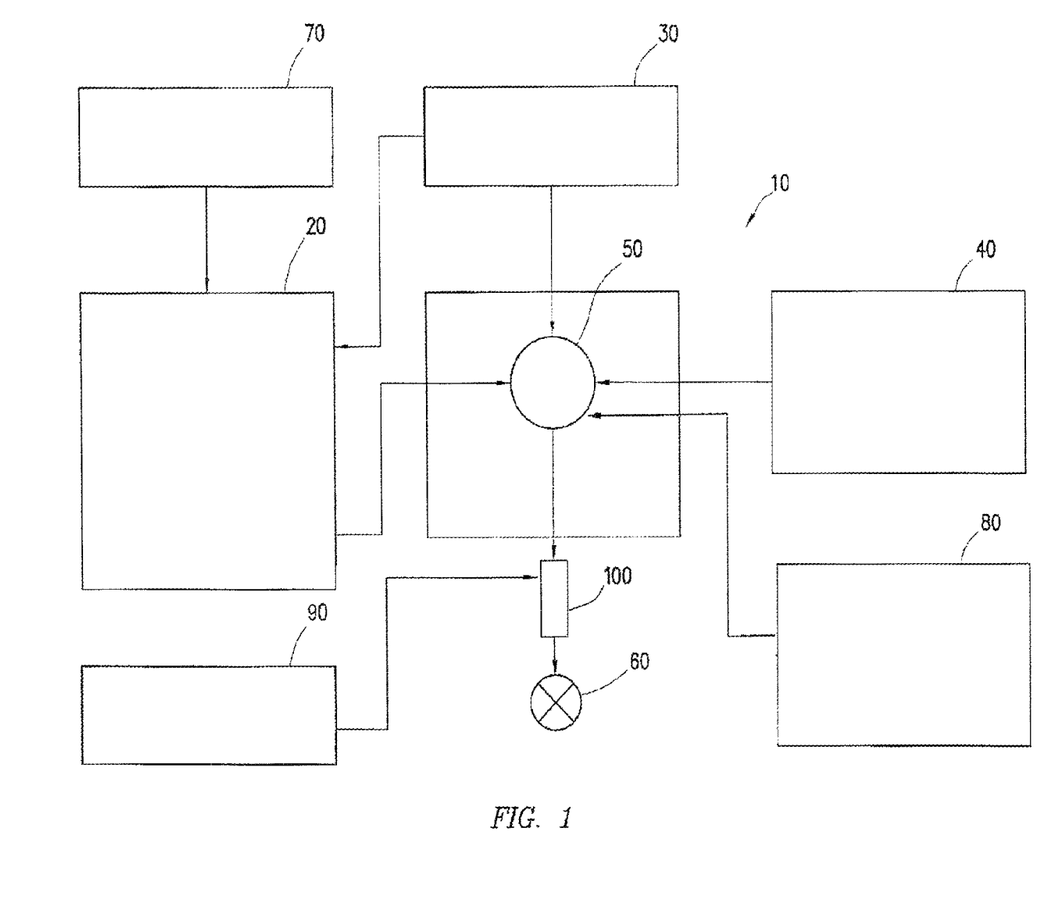
FIG. 1 is a diagram illustrating an example of a fracturing system that may be used in accordance with certain embodiments of the present disclosure.

The nanoparticle source 40 can include nanoparticles for combination with the aqueous fluid and the one or more surfactants. In certain embodiments, a plurality of nanoparticles of the present disclosure may be provided in the particle source 40 and thereby combined with the aqueous fluid and the one or more surfactants. In certain embodiments, the plurality of nanoparticles are added in the form of an aqueous or non-aqueous nanoparticle slurry. The system may also include additional additive source 80 that provides one or more additives (e.g., micro-proppant, proppant, gelling agents, weighting agents, and/or other additives) to alter the properties of the treatment fluid. For example, the other additives 80 can be included to reduce pumping friction, to reduce or eliminate the fluid's reaction to the geological formation in which the well is formed, to inhibit corrosion, and/or to serve other functions.

The pump and blender system 50 receives the aqueous fluid and one or more surfactants and combines them with other components, including nanoparticles from the nanoparticle source 40 and/or additional additives 80. The resulting mixture may be pumped to the in-line mixer 100, where it is combined with a gas from gas source 90. Gas source 90 may provide one or more gases to foam the fluid (e.g., natural gas). The in-line mixer 100 mixes the one or more gases with the fluid mixture to form a foamed treatment fluid. The foamed treatment fluid may be pumped down the well 60 under a pressure sufficient to create or enhance one or more fractures in a subterranean zone, for example, to stimulate production of fluids from the zone. Notably, in certain instances, the aqueous fluid producing apparatus 20, fluid source 30, nanoparticle source 40, and/or additive source 80 may be equipped with one or more metering devices (not shown) to control the flow of fluids, nanoparticles, proppant particles, and/or other compositions to the pumping and blender system 50. Such metering devices may permit the pumping and blender system 50 to source from one, some or all of the different sources at a given time, and may facilitate the preparation of foamed treatment fluids in accordance with the present disclosure using continuous mixing or "on-the-fly" methods. Thus, for example, the pumping and blender system 50 can provide just foamed treatment fluid into the well at some times, just particles at other times, and combinations of those components at yet other times.

Figure 2:
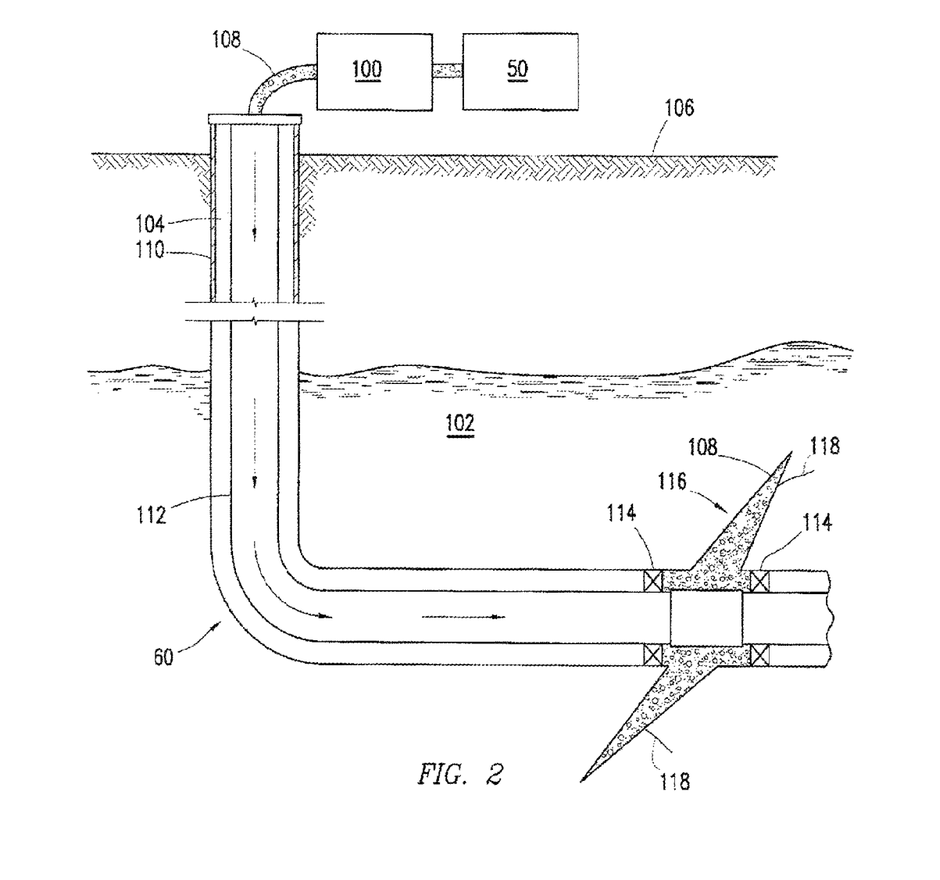
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids (e.g., the treatment fluids of the present disclosure) and/or other materials to flow into the subterranean formation 102. In cased wells, perforations can be formed using shape charges, a perforating gun, hydro jetting and/or other tools.

The well is shown with a work string 112 depending from the surface 106 into the wellbore 104. The pump and blender system 50 is coupled to the in-line mixer 100 which is coupled to a work string 112 to pump the treatment fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the treatment fluid 108 directly into the subterranean formation 102, and/or the working string 112 may include ports that are spaced apart from the wellbore wall to communicate the treatment fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the treatment fluid 108 will be pumped. FIG. 2 shows two packers 114, one defining an uphole boundary of the interval and one defining the downhole end of the interval. When the treatment fluid 108 is introduced into wellbore 104 (e.g., in FIG. 2, the area of the wellbore 104 between packers 114) at a sufficient hydraulic pressure, one or more fractures 116 or microfractures 118 may be created in the subterranean zone 102. The nanoparticles, proppant, and/or micro-proppant in the treatment fluid 108 may enter the fractures 116 or microfracture 118 where they may remain after the treatment fluid flows out of the wellbore. These nanoparticles or proppant particulates may "prop" fractures 116 or microfractures 118 such that fluids may flow more freely through the fractures 116 or microfractures 118.

The fluid of the present disclosure may also directly or indirectly affect the various downhole or subterranean equipment and tools that can come into contact with the fluid during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above.

While not specifically illustrated herein, the disclosed methods and compositions may also directly or indirectly affect any transport or delivery equipment used to convey the compositions to a system such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method including: introducing a foamed treatment fluid into a wellbore penetrating at least a portion of a subterranean formation at or above a pressure sufficient to create or enhance one or more fractures in the subterranean formation, wherein the foamed treatment fluid includes an aqueous base fluid, one or more surfactants, a natural gas, and a plurality of nanoparticles.

In one or more embodiments described above, the plurality of nanoparticles are present in an amount of at least 5% by weight of the foamed treatment fluid. In one or more embodiments described above, the plurality of nanoparticles are present in in an amount effective to stabilize the foamed treatment fluid. In one or more embodiments described above, the foamed treatment fluid includes a mixture of natural gas and one or more other gases. In one or more embodiments described above, the one or more surfactants are present in an amount of from about 0.5 to about 12 gallons per thousand gallons of the foamed treatment fluid. In one or more embodiments described above, the method further includes forming the foamed treatment fluid by mixing the aqueous base fluid, the one or more surfactants, and the plurality of nanoparticles with the gas in an in-line mixer. In one or more embodiments described above, the plurality of nanoparticles includes nanoparticles selected from the group consisting of: silica, carbon black, laponite, graphene, aluminum, iron, titanium, a metal oxide, a hydroxide, an alkali earth metal, an alkali earth metal oxide, a transition metal, a transition metal oxide, a post-transition metal, a post-transition metal oxide, and any combination thereof. In one or more embodiments described above, the plurality of nanoparticles includes nanoparticles selected from the group consisting of: crystalline nanocellulose, chitin, a lignin, a starch, a protein, and any combination thereof. In one or more embodiments described above, the method further includes allowing the foamed treatment fluid to at least partially degrade in response to one or more conditions, additives, or substances. In one or more embodiments described above, the method further includes allowing at least a portion of the plurality of nanoparticles to deposit in one or more fractures or microfractures in the subterranean formation. In one or more embodiments described above, the foamed treatment fluid is introduced into the wellbore using one or more pumps.

Another embodiment of the present disclosure is a foamed treatment fluid including an aqueous base fluid; one or more surfactants; a plurality of nanoparticles; and natural gas. In one or more embodiments described above, the foamed treatment fluid includes a petroleum distillate. In one or more embodiments described above, the natural gas is present in the foamed treatment fluid in an amount in the range of from about 20% to about 80% by volume. In one or more embodiments described above, the one or more surfactants are present in an amount of from about 0.5 to about 12 gallons per thousand gallons of the foamed treatment fluid. In one or more embodiments described above, the foamed treatment fluid includes a proppant material. In one or more embodiments described above, the foamed treatment fluid includes a micro-proppant material.

Another embodiment of the present disclosure is a method including introducing a first foamed treatment fluid into a wellbore penetrating at least a portion of a subterranean formation at or above a pressure sufficient to create or enhance at least one fracture in the subterranean formation, wherein the first foamed treatment fluid includes a first gas, a first aqueous base fluid, one or more first surfactants, and a first plurality of nanoparticles; introducing a second treatment fluid into the wellbore at or above a pressure sufficient to create or enhance at least one microfracture in the subterranean formation, wherein the second treatment fluid includes a second gas, a second aqueous base fluid, a second plurality of nanoparticles, and a micro-proppant material; and introducing a third foamed treatment fluid into the wellbore, wherein the third foamed treatment fluid includes a third gas, a third aqueous base fluid, a third plurality of nanoparticles, one or more second surfactants, and a proppant material.

In one or more embodiments described above, at least one of the first foamed treatment fluid and the second treatment fluid include at least one of a hydrolysable in-situ acid generator particle and a hydrolysable in-situ chelating agent generator particle. In one or more embodiments described above, at least one of the first gas, the second gas, and the third gas include natural gas.

An embodiment of the present disclosure is a method comprising introducing a first foamed treatment fluid into a wellbore penetrating at least a portion of a subterranean formation at or above a pressure sufficient to create or enhance at least one fracture, wherein the first foamed treatment fluid comprises a first gas, a first aqueous base fluid, one or more first surfactants, and a first plurality of nanoparticles; and introducing a second treatment fluid into the wellbore at or above a pressure sufficient to create or enhance at least one microfracture, wherein the second treatment fluid comprises a second gas, a second aqueous base fluid, a second plurality of nanoparticles, and a micro-proppant; repeating the steps of introducing the first foamed treatment fluid and the second treatment fluid into the wellbore one or more times to enhance the generation of fracture networks in at least one of a near-wellbore or far-field region of the subterranean formation and enhance a placement of nanoparticles and micro-proppant in the microfractures; and introducing a third foamed treatment fluid into the wellbore for enhancing placement of proppant in the created fractures and ensuring connectivity of created complex fracture networks with the wellbore; wherein the third foamed treatment fluid comprises a third gas, a third aqueous base fluid, a third plurality of nanoparticles, one or more second surfactants, and a proppant.

To facilitate a better understanding of the present disclosure, the following example of certain aspects of preferred embodiments are given. The following example is not the only example that could be given according to the present disclosure and is not intended to limit the scope of the disclosure or claims.

Example

A foam stability experiment was performed to observe the effects of nanoparticles on foam stability. A control experiment was carried out using 100 mL of Houston tap water as a base fluid. This fluid was added to a 1-L blender along with 3 gptg of a surfactant blend. The mixture was stirred at 12,000 rpm for 30 seconds to create foam. To form a nanoparticle-treated foam, a test solution containing 100 mL of the Houston tap water base fluid was added to a separate 1-L blender, to which 3 gptg of the same surfactant blend and 5% by weight of Carbon Black nanoparticles were added. This second mixture was also stirred to create foam. The stability of each foam was tested using a half volume displacement method. The foams were placed into 500-mL graduated cylinders, the total volume of the foam was measured, and a timer was set to monitor how fast 50 mL of fluid would form at the bottom of cylinder and displace the foam. Table 1 shows the results of the foam stability test for the control foam (without nanoparticles) and the nanoparticle-treated foam. As shown below, the foam volume dispersed much slower for the nanoparticle-treated foam than the control foam, indicating that the nanoparticle-treated foam was more stable.

TABLE 1

| $t_{1/2}$ Foam (seconds) | Nanoparticle Type | Foam Volume (ml) |
| --- | --- | --- |
| 200 | None (Control) | 300 |
| Over 300 | Carbon Black | 375 |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
introducing a foamed treatment fluid into a wellbore penetrating at least a portion of a subterranean formation at or above a pressure sufficient to create or enhance one or more fractures in the subterranean formation, wherein the foamed treatment fluid comprises:
an aqueous base fluid,
one or more surfactants,
a natural gas, and
a plurality of nanoparticles wherein at least a portion of the plurality of nanoparticles are coated wherein the coating comprises a paraffin inhibitor, a formation stabilizer, a scale inhibitor or a combination thereof.

2. The method of claim 1, wherein the plurality of nanoparticles are present in an amount of at least 5% by weight of the foamed treatment fluid.

3. The method of claim 1, wherein the plurality of nanoparticles are present in an amount effective to stabilize the foamed treatment fluid.

4. The method of claim 1, wherein the foamed treatment fluid comprises a mixture of natural gas and one or more other gases.

5. The method of claim 1, wherein the one or more surfactants are present in an amount of from about 0.5 to about 12 gallons per thousand gallons of the foamed treatment fluid.

6. The method of claim 1, further comprising forming the foamed treatment fluid by mixing the aqueous base fluid, the one or more surfactants, and the plurality of nanoparticles with the gas in an in-line mixer.

7. The method of claim 1, wherein the plurality of nanoparticles comprise at least one material selected from the group consisting of: silica, carbon black, laponite, graphene, aluminum, iron, titanium, a metal oxide, a hydroxide, an alkali earth metal, an alkali earth metal oxide, a transition metal, a transition metal oxide, a post-transition metal, a post-transition metal oxide, and any combination thereof.

8. The method of claim 1, wherein the plurality of nanoparticles comprise at least one material selected from the group consisting of: crystalline nanocellulose, chitin, a lignin, a starch, a protein, and any combination thereof.

9. The method of claim 1, further comprising the step of allowing the foamed treatment fluid to at least partially degrade.

10. The method of claim 1, further comprising depositing at least a portion of the plurality of nanoparticles in one or more fractures or microfractures in the subterranean formation.

11. The method of claim 1, wherein the foamed treatment fluid is introduced into the wellbore using one or more pumps.

12. The method of claim 1, wherein the at least a portion of the plurality of nanoparticles have a d50 particle size distribution of from about 0.1 nm to about 100 nm.

13. A method comprising:
introducing a foamed treatment fluid into a wellbore penetrating at least a portion of a subterranean formation at or above a pressure sufficient to create or enhance one or more fractures in the subterranean formation, wherein the foamed treatment fluid comprises:
an aqueous base fluid,
one or more surfactants,
a natural gas, and
a plurality of nanoparticles comprising silica; and
depositing at least a portion of the plurality of nanoparticles in one or more fractures or microfractures in the subterranean formation wherein the at least a portion of the plurality of nanoparticles are coated wherein the coating comprises a paraffin inhibitor, a formation stabilizer, a scale inhibitor or a combination thereof.

14. The method of claim 13, wherein the at least a portion of the plurality of nanoparticles are present in an amount of at least 5% by weight of the foamed treatment fluid.

15. The method of claim 13, wherein the at least a portion of the plurality of nanoparticles are present in an amount effective to stabilize the foamed treatment fluid.

16. The method of claim 13, wherein the foamed treatment fluid comprises a mixture of natural gas and one or more other gases.

17. The method of claim 13, wherein the one or more surfactants are present in an amount of from about 0.5 to about 12 gallons per thousand gallons of the foamed treatment fluid.

18. The method of claim 13, further comprising foaming the foamed treatment fluid by mixing the aqueous base fluid, the one or more surfactants, and the plurality of nanoparticles with the gas in an in-line mixer.

19. A method comprising:
introducing a first foamed treatment fluid into a wellbore penetrating at least a portion of a subterranean formation at or above a pressure sufficient to create or enhance at least one fracture in the subterranean formation, wherein the first foamed treatment fluid comprises
a first gas, a first aqueous base fluid, one or more first surfactants, and a first plurality of nanoparticles wherein at least a portion of the first plurality of nanoparticles are coated wherein the coating comprises a paraffin inhibitor, a formation stabilizer, a scale inhibitor or a combination thereof;
introducing a second treatment fluid into the wellbore at or above a pressure sufficient to create or enhance at least one microfracture in the subterranean formation, wherein the second treatment fluid comprises
a second gas, a second aqueous base fluid, a second plurality of nanoparticles, and a micro-proppant material wherein at least a portion of the second plurality of nanoparticles are coated wherein the coating comprises a paraffin inhibitor, a formation stabilizer, a scale inhibitor or a combination thereof; and
introducing a third foamed treatment fluid into the wellbore, wherein the third foamed treatment fluid comprises
a third gas, a third aqueous base fluid, a third plurality of nanoparticles, one or more second surfactants, and a proppant material wherein at least a portion of the third plurality of nanoparticles are coated wherein the coating comprises a paraffin inhibitor, a formation stabilizer, a scale inhibitor or a combination thereof.

20. The method of claim 19, wherein at least one of the first foamed treatment fluid and the second treatment fluid comprise at least one of a hydrolysable in-situ acid generator particle and a hydrolysable in-situ chelating agent generator particle.

21. The method of claim 19, wherein at least one of the first gas, the second gas, and the third gas comprises natural gas.

* * * * *